US009001336B1

(12) United States Patent
Qiu et al.

(10) Patent No.: US 9,001,336 B1
(45) Date of Patent: Apr. 7, 2015

(54) METHODS AND APPARATUS OF TRACKING/LOCKING RESONATOR FREE SPECTRAL RANGE AND ITS APPLICATION IN RESONATOR FIBER OPTIC GYROSCOPE

(71) Applicant: Honeywell International Inc., Morristown, NJ (US)

(72) Inventors: Tiequn Qiu, Glendale, AZ (US); Jianfeng Wu, Tuscon, AZ (US); Lee K. Strandjord, Tonka Bay, MN (US); Glen A. Sanders, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 66 days.

(21) Appl. No.: 14/047,855

(22) Filed: Oct. 7, 2013

(51) Int. Cl.
G01C 19/72 (2006.01)
G01C 19/66 (2006.01)

(52) U.S. Cl.
CPC .................................. G01C 19/661 (2013.01)

(58) Field of Classification Search
CPC ...................................................... G01C 19/661
USPC ........................................................ 356/461
See application file for complete search history.

(56) References Cited

U.S. PATENT DOCUMENTS

| | | | |
|---|---|---|---|
| 3,861,220 A | 1/1975 | Felsenthal, Jr. | |
| 4,135,822 A | 1/1979 | Ezekiel | |
| 4,274,742 A | 6/1981 | Lustig | |
| 4,323,310 A | 4/1982 | Shaw et al. | |
| 4,352,562 A | 10/1982 | Minden | |
| 4,673,293 A | 6/1987 | Sanders | |
| 4,702,600 A | 10/1987 | Handrich et al. | |
| 4,807,999 A | 2/1989 | Soo Hoo | |
| 4,815,851 A | 3/1989 | Soohoo | |

(Continued)

FOREIGN PATENT DOCUMENTS

| | | |
|---|---|---|
| EP | 0240949 | 10/1987 |
| EP | 1391693 | 2/2004 |

OTHER PUBLICATIONS

Chow et al., "Backscatter-immune, Polarization Managed, All Fiber Sagnac Sensing Interferometer", "Optics Express ", Mar. 19, 2007, pp. 3110-3119, vol. 15, No. 6.

(Continued)

Primary Examiner — Tarifur Chowdhury
Assistant Examiner — Omar Nixon
(74) Attorney, Agent, or Firm — Fogg & Powers LLC (57) ABSTRACT

A resonator fiber optic gyroscope is provided. The resonator fiber optic gyroscope includes a gyroscope resonator, a laser; a clockwise modulator; a clockwise circulator; a clockwise reflection detector; a first-lock-in-amplifier, a clockwise-resonance-tracking servo to receive output from the first-lock-in-amplifier and to provide feedback to the laser to lock the laser to the gyroscope resonator; a clockwise transmission detector to detect an optical beam output from the counter-clockwise input port; a second servo; a second-lock-in-amplifier; and a third-lock-in-amplifier. The first and second lock-in-amplifiers demodulate at the first harmonic of the modulation frequency. The second-lock-in-amplifier demodulates at the second harmonic of the modulation frequency. Either the modulation frequency of the clockwise optical beam is locked to (n+0.5) times the FSR through the second servo, where n is zero or a positive integer, or the FSR is locked to 1/(n+0.5) times the modulation frequency of the clockwise optical beam through the second servo.

20 Claims, 6 Drawing Sheets

(56) References Cited

U.S. PATENT DOCUMENTS

| | | |
|---|---|---|
| 4,863,272 A | 9/1989 | Coccoli |
| 4,921,354 A | 5/1990 | SooHoo |
| 5,018,857 A | 5/1991 | Sanders et al. |
| 5,018,858 A | 5/1991 | Malvern |
| 5,090,809 A | 2/1992 | Ferrar |
| 5,090,810 A | 2/1992 | Malvern |
| 5,100,236 A | 3/1992 | Hoo et al. |
| 5,112,128 A | 5/1992 | Soo Hoo et al. |
| 5,131,749 A | 7/1992 | Varnham |
| 5,141,315 A | 8/1992 | Malvern |
| RE34,121 E | 11/1992 | Benoist |
| 5,229,831 A | 7/1993 | Carroll et al. |
| 5,237,387 A | 8/1993 | Sanders |
| 5,289,258 A | 2/1994 | Szafraniec et al. |
| 5,296,912 A | 3/1994 | Strandjord et al. |
| 5,325,174 A | 6/1994 | Danko |
| 5,349,441 A | 9/1994 | Sanders |
| 5,384,637 A | 1/1995 | Sanders et al. |
| 5,398,111 A | 3/1995 | Cardarelli |
| 5,420,684 A | 5/1995 | Carroll |
| 5,459,575 A | 10/1995 | Malvern |
| 5,465,149 A | 11/1995 | Strandjord et al. |
| 5,469,257 A | 11/1995 | Blake et al. |
| 5,493,623 A | 2/1996 | Frische et al. |
| 5,526,451 A | 6/1996 | Cahill et al. |
| 5,610,714 A | 3/1997 | Malvern et al. |
| 5,734,469 A | 3/1998 | Strandjord |
| 5,767,968 A | 6/1998 | Strandjord |
| 5,781,300 A | 7/1998 | Strandjord et al. |
| 5,923,424 A | 7/1999 | Sanders et al. |
| 5,926,275 A | 7/1999 | Sanders et al. |
| 6,014,217 A | 1/2000 | Sanders et al. |
| 6,175,410 B1 | 1/2001 | Szafraniec et al. |
| 6,204,921 B1 | 3/2001 | Strandjord et al. |
| 6,539,155 B1 | 3/2003 | Broeng et al. |
| 6,567,436 B1 | 5/2003 | Yao et al. |
| 6,690,687 B2 | 2/2004 | Ksendzov et al. |
| 6,765,678 B2 | 7/2004 | Strandjord et al. |
| 6,778,279 B2 | 8/2004 | Lange et al. |
| 6,801,324 B1 | 10/2004 | Gray et al. |
| 6,865,317 B2 | 3/2005 | Vahala et al. |
| 6,885,794 B2 | 4/2005 | Scheuer et al. |
| 7,034,946 B2 | 4/2006 | Chen et al. |
| 7,038,783 B2 | 5/2006 | Standjord et al. |
| 7,065,276 B2 | 6/2006 | Scheuer et al. |
| 7,123,800 B2 | 10/2006 | Kaplan |
| 7,149,381 B2 | 12/2006 | Margalit et al. |
| 7,231,103 B2 | 6/2007 | Yamashita |
| 7,245,381 B2 | 7/2007 | Marino et al. |
| 7,327,460 B2 | 2/2008 | Sanders et al. |
| 7,362,443 B2 | 4/2008 | Sanders et al. |
| 7,372,574 B2 | 5/2008 | Sanders et al. |
| 7,388,671 B2 | 6/2008 | Sanders et al. |
| 7,463,360 B2 | 12/2008 | Hughes et al. |
| 7,515,272 B2 | 4/2009 | Strandjord et al. |
| 7,522,284 B2 | 4/2009 | Sanders et al. |
| 7,583,384 B2 | 9/2009 | Keith et al. |
| 7,586,619 B2 | 9/2009 | Strandjord et al. |
| 7,751,055 B2 | 7/2010 | Sanders et al. |
| 7,802,928 B2 | 9/2010 | Strabley et al. |
| 7,848,601 B2 | 12/2010 | Carothers |
| 7,855,789 B2 | 12/2010 | Strandjord et al. |
| 7,864,328 B2 | 1/2011 | Strandjord |
| 7,869,052 B2 | 1/2011 | Strandjord |
| 7,933,020 B1 | 4/2011 | Strandjord et al. |
| 8,009,296 B2 | 8/2011 | Sanders et al. |
| 8,085,407 B2 | 12/2011 | Qiu et al. |
| 8,184,299 B2 | 5/2012 | Kitamura et al. |
| 8,213,019 B2 | 7/2012 | Strandjord et al. |
| 2002/0044737 A1 | 4/2002 | Hung |
| 2003/0169428 A1 | 9/2003 | Lange |
| 2004/0061863 A1 | 4/2004 | Digonnet |
| 2004/0263856 A1 | 12/2004 | Willig et al. |
| 2007/0097374 A1 | 5/2007 | Ren-Young |
| 2007/0133003 A1 | 6/2007 | Sanders et al. |
| 2007/0242276 A1 | 10/2007 | Hughes et al. |
| 2008/0079946 A1 | 4/2008 | Greening |
| 2008/0137091 A1 | 6/2008 | Sanders et al. |
| 2010/0002239 A1 | 1/2010 | Strandjord et al. |
| 2010/0046000 A1 | 2/2010 | Kitamura et al. |
| 2010/0053631 A1 | 3/2010 | Kitamura |
| 2010/0225922 A1 | 9/2010 | Strandjord |
| 2010/0225923 A1 | 9/2010 | Strandjord et al. |
| 2010/0245834 A1 | 9/2010 | Strandjord |
| 2010/0253948 A1 | 10/2010 | Strandjord et al. |
| 2011/0168913 A1 | 7/2011 | Givon et al. |
| 2011/0181886 A1 | 7/2011 | Strandjord et al. |
| 2011/0181887 A1 | 7/2011 | Tarleton et al. |
| 2011/0255094 A1 | 10/2011 | Mohageg et al. |
| 2011/0292396 A1 | 12/2011 | Strandjord et al. |
| 2012/0050745 A1 | 3/2012 | Qiu et al. |
| 2012/0057167 A1* | 3/2012 | Strandjord et al. ........... 356/461 |

OTHER PUBLICATIONS

Vawter et el., "Developments in Pursuit of a Micro-Optic Gyroscope", "Sand Report SAND2003-0665", Mar. 2003, pp. 1-39.

\* cited by examiner

METHODS AND APPARATUS OF TRACKING/LOCKING RESONATOR FREE SPECTRAL RANGE AND ITS APPLICATION IN RESONATOR FIBER OPTIC GYROSCOPE

BACKGROUND

The Resonator Fiber Optic Gyroscope (RFOG) has the potential of meeting the needs in many areas of the inertial sensing market. To overcome optical backscatter errors, currently available RFOGs lock the clockwise (CW) and counter-clockwise (CCW) laser frequencies onto different longitudinal modes of the gyro sensing resonator. These technologies separate the counter-propagating laser frequencies and up-convert the interference signals between counter-propagating lightwaves well above the rotation measurement frequency band. However, if only two lasers are used, the gyro sensing resonator free spectral range (FSR) becomes a part the rotation measurement. Thus, in prior art RFOGs, the gyro sensing resonator free spectral range must be measured with great precision to reduce the adverse effects caused by FSR variations and more than two lasers are typically used.

To avoid interference between the CW and CCW light, which happens due to back reflection when lasers are locked to the same resonance at low rotation rate, the prior art uses methods of locking three or more lasers to three different resonances. To accurately measure the FSR, currently available RFOGs use a third laser frequency to probe the sensing resonator. Resonance frequencies of the gyro resonator must be precisely measured to obtain an accurate measure of the FSR and rotation. Modulation is used for detecting the resonance frequency. For a master/two slave configuration, it is difficult to modulate all three lasers to detect resonance in a way that modulation imperfections do not cause large errors. Slave lasers can be modulated with high precision by using digital techniques combined with high gain optical phase lock loops, but it is difficult to modulate the master laser with high precision since the modulation eventually becomes an open loop analog current or voltage.

Other currently available RFOGs use a master laser and three slave lasers. In this latter technology, the master laser is not used for rotation sensing and the three slave lasers are modulated with high precision. However, the number of lasers and associated phase lock loop electronics results in a significant increase in the cost, size, weight, and electrical power consumption of the RFOG.

Thus, an RFOG that requires only two lasers for rate measurement without errors when the FSR of the gyro sensing resonator changes (due to temperature fluctuations and the like) is preferred.

SUMMARY

The present application relates to a resonator fiber optic gyroscope. The resonator fiber optic gyroscope includes a gyroscope resonator having a clockwise input port and a counter-clockwise input port and a free spectral range (FSR) corresponding to the resonator round trip length; a laser configured to couple a clockwise optical beam into to the clockwise input port; a clockwise modulator to impose a modulation frequency equivalent to (n+0.5) times the FSR on the clockwise optical beam before the clockwise optical beam is coupled into the clockwise input port, where n is zero or a positive integer; a clockwise circulator; a clockwise reflection detector to detect the clockwise optical beam output from a clockwise reflection port; a first-lock-in-amplifier to receive a signal from the clockwise reflection detector; a clockwise-resonance-tracking servo to receive output from the first-lock-in-amplifier and to provide feedback to the laser to lock the laser to the gyroscope resonator; a clockwise transmission detector to detect an optical beam output from the counter-clockwise input port; a second servo; a second-lock-in-amplifier to receive a signal from the clockwise transmission detector; and a third-lock-in-amplifier to receive a signal from the clockwise transmission detector. The first-lock-in-amplifier demodulates at the first harmonic of the modulation frequency of the clockwise optical beam. The second-lock-in-amplifier demodulates at the second harmonic of the modulation frequency of the clockwise optical beam and provides feedback to the second servo. The third-lock-in-amplifier demodulates at the first harmonic of the modulation frequency of the clockwise optical beam and provides feedback to the clockwise-resonance-tracking servo to correct errors in a clockwise resonance tracking loop. Either the modulation frequency of the clockwise optical beam is locked to (n+0.5) times the FSR through the second servo, where n is zero or a positive integer, or the FSR is locked to 1/(n+0.5) times the modulation frequency of the clockwise optical beam through the second servo.

DRAWINGS

In accordance with common practice, the various described features are not drawn to scale but are drawn to emphasize features relevant to the present application. Like reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present application. The following detailed description is, therefore, not to be taken in a limiting sense.

The RFOG systems described herein employ laser frequency (or phase) modulation and demodulation schemes that reduce the number of required lasers to two. The resonator fiber optic gyroscope (RFOG) system described herein uses only two lasers that are locked to separate resonances. The free spectral range (FSR) of the resonator in the RFOG and a laser modulation frequency of the optical beams coupled to the gyroscope resonator are locked with each other. Advantageously, the RFOG system described herein removes the need for a third laser to measure the FSR in order to determine the rotation rates. Since the lasers are locked to different resonance frequencies, the backscatter errors are reduced.

The two input laser beams are frequency or phase modulated at (n+0.5)FSR, where n is an integer number, and FSR is the free spectral range determined by the resonator round trip length. The FSR typically ranges from a few hundred kHz to 100 MHz. The resonance tracking modulation is set at high frequency by proper selection of the number n. A typical modulation frequency can be 10 MHz or higher. When the modulation is set at these high frequencies, the impact of laser intrinsic relative intensity noise (RIN) is normally very low. In addition, laser phase noise induced RIN at high frequencies can be controlled by passive optical filters. The high speed RIN servos used in prior art RFOGs can thus be eliminated, the optical loss in the RFOG is therefore reduced, and the laser power required for the RFOG is reduced. In addition, high frequency phase noise can be controlled entirely with passive filtering of the gyroscope resonator. In one implementation of this embodiment, at least some passive filtering of both RIN and laser phase noise is achieved with an unbalanced Mach Zehnder interferometer instead of a cavity. This latter embodiment provides lower optical loss, reduced laser power, and simplified filter control electronics.

In the RFOG systems described herein, the modulation frequency of the CW optical beam and the FSR of the gyroscope resonator are locked to each other in one of two ways. In one implementation of this embodiment, the modulation frequency of the CW optical beam is locked to the (n+0.5) FSR of the gyroscope resonator, while the modulation frequency of a CCW optical beam is locked to (p+0.5)FSR of the gyroscope resonator, where each of p and n are zero or a positive integer, and where p does not equal n. In another implementation of this embodiment, the FSR of the gyroscope resonator is adjusted so that it equals the modulation frequency of a CW optical beam divided by (n+0.5), i.e., $FSR=f_m/(n+0.5)$, where $f_m$ is the modulation frequency of the CW optical beam. In yet another implementation of this embodiment, with the modulation frequency of a CCW optical beam locked to (p+0.5)FSR of the gyroscope resonator (p and n are zero or a positive integer and p does not equal n), the FSR of the gyroscope resonator is adjusted so that it equals the modulation frequency of the CCW optical beam divided by (p+0.5), i.e., $FSR=f_m/(p+0.5)$, where $f_m$ is the modulation frequency of the CCW optical beam. The terms "optical beam", "beam", and optical signal" are interchangeably herein. The terms "frequency modulation", "phase modulation" and simply "modulation" are interchangeably herein.

At least one resonance tracking loop (e.g., a CW resonance tracking loop) includes a resonance tracking (RT) servo that adjusts the CW laser optical frequency (or wavelength) based on feedback from both a CW reflection port detector and a CW transmission port detector. Part of the light in the optical beam detected at the CW reflection port detector is not passed through the gyroscope resonator. All of the light in the optical beam detected at the CW transmit port detector has been transmitted through the resonator. Thus, the signal based on output from the CW transmit port detector is cleaner (i.e., has less of the wrong polarization state of light) than the signal from the CW reflection detector. The reflection port detector signal has a quick response to transients (in other words: high bandwidth) and is fed back to a Pound-Drever-Hall (PDH) servo loop to achieve a tight lock of the lasers to the resonator. The terms "transmit port detector" and "transmission detector" are used interchangeably herein.

Feedback based on the output from the CW transmit port detector is used to compensate bias errors in the CW resonance tracking loop by driving the PDH loop integrator bias to remove the error. As is understandable to one skilled in the art, the same process can be applied to a CCW resonance tracking loop in place of the CW resonance tracking loop. In one implementation of this embodiment, feedback can be applied to the CCW resonance tracking loop to correct errors in a CCW resonance tracking loop.

The terms "sensing resonator", "gyroscope resonator coil", "gyro sensing resonator" and "gyroscope resonator" are used interchangeably herein.

Figure 1:
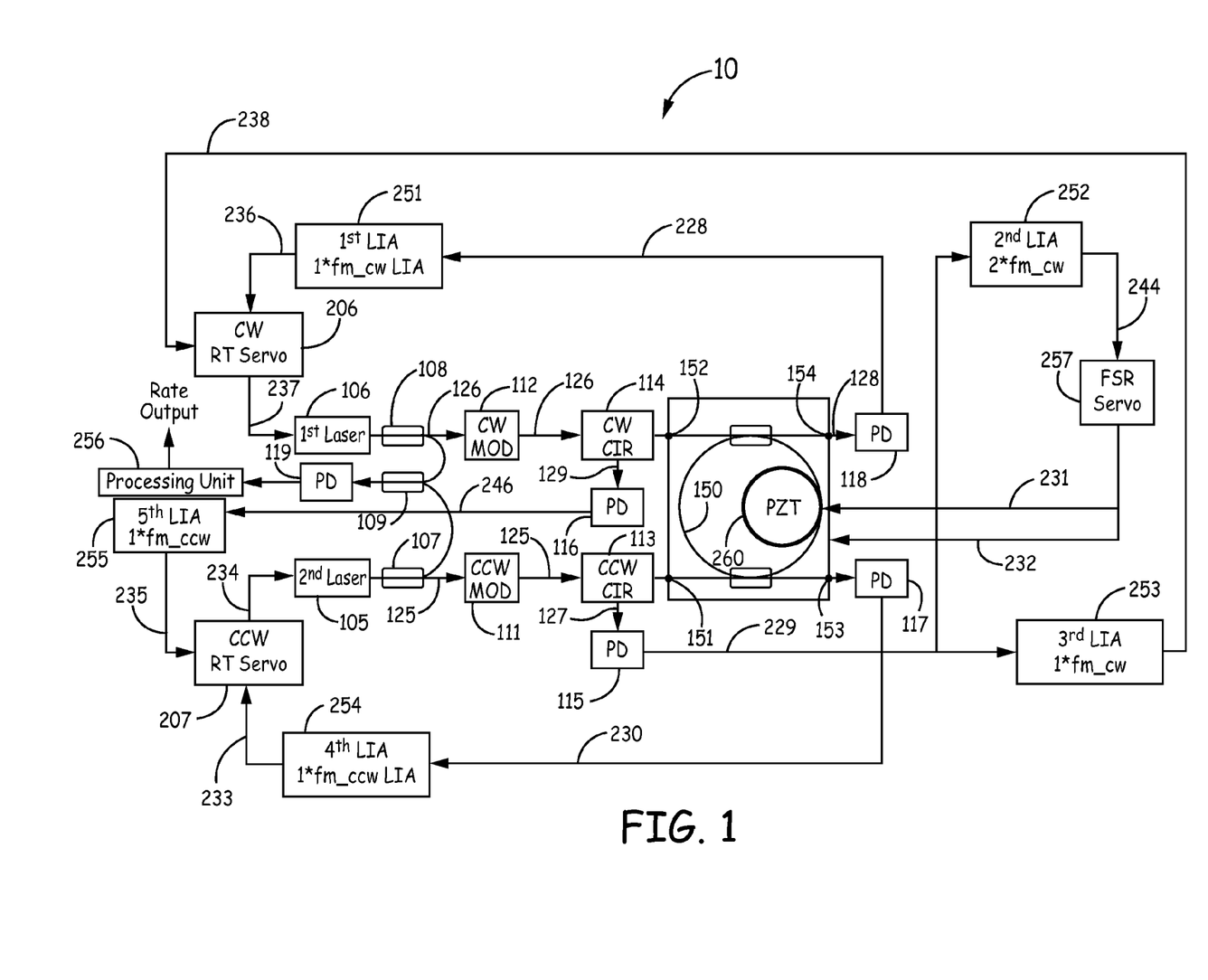
FIG. 1 is a block diagram of one embodiment of a Resonator Fiber Optic Gyroscope (RFOG) system with two lasers in accordance with the present application.

FIG. 1 is a block diagram of one embodiment of a Resonator Fiber Optic Gyroscope (RFOG) system 10 with two lasers 105 and 106 in accordance with the present application. The lasers 105 and 106 are tunable lasers. High bandwidth resonance tracking loops reduce the relative frequency noise between the lasers 105 and 106 by stabilizing the lasers 105 and 106 to the same optical cavity, the gyro sensing resonator 150. The free spectral range (FSR) of a gyroscope resonator 150 in the RFOG system 10 and a CW laser modulation frequency fm_cw of an optical beam 126 coupled to an input port 152 of the gyroscope resonator 150 are locked to each other through relationship of fm_cw=(n+0.5)FSR, where n is zero or a positive integer.

The RFOG 10 includes a counter-clockwise (CCW) laser 105, a clockwise (CW) laser 106, a CCW modulator 111, a CW modulator 112, circulators 113 and 114, a gyroscope resonator 150 with ports 151-154, photodetectors 115, 116, 117, 118, and 119, a first-lock-in amplifier 251, a second-lock-in amplifier 252, a third-lock-in amplifier 253, a fourth-lock-in amplifier 254, a fifth-lock-in amplifier 255, a CW resonance tracking servo 206, a CCW resonance tracking servo 207, a free-spectral-range (FSR) servo 257, and a piezoelectric device (PZT) 260. As is known to one skilled in the art, the piezo-electric device 260 can be a lead zirconate titanate (PZT) device 260 that expands or shrinks under application of voltages. The RFOG 10 also includes couplers 107, 108, and 109 and a processing unit 259, which includes at least one processor configured to execute software to determine a rotation rate $f_r$ of the gyroscope resonator 150. The processing unit 259 outputs the rotation rate $f_r$ of the gyroscope resonator 150 (rate output).

In one implementation of this embodiment, the CW modulator 112 is a CW phase modulator. In another implementation of this embodiment, the CW modulator 112 is a CW frequency modulator. In yet another implementation of this embodiment, the CCW modulator 111 is a CCW phase modulator. In yet another implementation of this embodiment, the CCW modulator 111 is a CCW frequency modulator.

The gyroscope resonator 150 is also referred to herein as "sensing resonator 150", "gyroscope resonator coil 150", "gyro sensing resonator 150". The gyroscope resonator 150 can comprise a solid core optical fiber or a hollow optical fiber, plus two optical power splitting couplers (i.e., "resonator couplers" for coupling light into and out of the gyroscope resonator 150). In one implementation of this embodiment, the RFOG 10 is configured so the FSR of gyroscope resonator 150 is adjusted as required to lock to the frequency of fm_cw/(n+0.5), where fm_cw is the modulation frequency of CW optical beam 126. In another implementation of this embodiment, the RFOG 10 is configured so the FSR of gyroscope resonator 150 is adjusted as required to lock to the frequency of fm_ccw/(p+0.5), where fm_ccw is the modulation frequency of CCW optical beam 125. An implementation in which the modulation frequency of the CW optical beam 126 and the CW optical beam 125 are adjusted as required to lock to the FSR of the gyroscope resonator 150 is described below with reference to the RFOG 11 of FIG. 5.

The port 151 is referred to herein as "counter-clockwise input port 151" and "CW transmission output port 151". The port 152 is referred to herein as "clockwise input port 152" and "CCW transmission output port 152". The port 153 is referred to herein as "CCW reflection output port 153". The port 154 is referred to herein as "CW reflection output port 154". The photodetector 115 is referred to herein as "CW transmission detector 115". The photodetector 116 is referred to herein as "CCW transmission detector 116". The photodetector 117 is referred to herein as "CCW reflection detector 117". The photodetector 118 is referred to herein as "CW reflection detector 118".

The CW resonance tracking loop includes the CW laser 106, the CW modulator 112, the CW circulator 114, the gyroscope resonator 150, the CW reflection detector 118, the first-lock-in-amplifier 251, and the CW resonance tracking servo 206. The CCW resonance tracking loop includes the CCW laser 105, a CCW modulator 111, the CCW circulator 113, the gyroscope resonator 150, the CCW reflection detector 117, the fourth-lock-in-amplifier 254, and the CCW resonance tracking servo 207.

An optical beam represented generally at 126 is emitted from the clockwise (CW) laser 106, passed through the CW modulator 112. The CW laser 106 is also referred to herein as "first laser 106". The optical beam 126 is also referred to herein as "clockwise optical beam 126", "CW light 126", and "CW beam 126". The CW modulator 112 modulates the clockwise optical beam 126 before the clockwise optical beam 126 is coupled into the clockwise input port 152 of the gyroscope resonator 150. The clockwise optical beam 126 output from the CW modulator 112 is passed through the optical circulator 114 to the gyroscope resonator 150 via the clockwise input port 152. The CW laser 106 is locked onto the resonance of the gyro resonator 150 with a high bandwidth feedback loop using Pound-Drever-Hall (PDH) modulation techniques that are known to those skilled in the art. The CW light 126 is modulated and demodulated at frequency fm_cw=(n+0.5)FSR. By proper setting of the lock-in amplifier 251 phase, the optical frequency of the laser 106, (i.e., the carrier frequency $f_1$ of CW beam) is locked midway between a first clockwise longitudinal mode and a second clockwise longitudinal mode of the sensing resonator 150 as shown in FIG. 2 and described below.

An optical beam represented generally at 125 emitted from the counter-clockwise (CCW) laser 105 is passed through the CCW modulator 111. The CCW laser 105 is also referred to herein as "second laser 106". The optical beam 125 is also referred to herein as "counter-clockwise optical beam 125", "CCW beam 125", and "CCW light 125". The modulator 111 modulates the counter-clockwise optical beam 125 before the counter-clockwise optical beam 125 is coupled into a counter-clockwise input port 151 of the gyroscope resonator 150. The counter-clockwise optical 125 beam output from the modulator 111 is passed through the optical circulator 113 to the gyroscope resonator 150 via the counter-clockwise input port 151. The CCW laser 105 is locked onto the resonance of the gyro resonator 150 with a high bandwidth feedback loop using the PDH method so the relative frequency noise between the CW laser 106, the CCW laser 105, and the gyro resonator 150 are substantially reduced when there is sufficient loop gain. Specifically, the CCW laser 105 is modulated and demodulated at fm_ccw=(p+0.5)FSR with a high bandwidth feedback loop using the PDH method. Similar to the case of clockwise optical beam 126, the carrier frequency $f_2$ of the counter-clockwise optical beam 125 is locked midway between two longitudinal modes of the sensing resonator 150.

Figure 2:
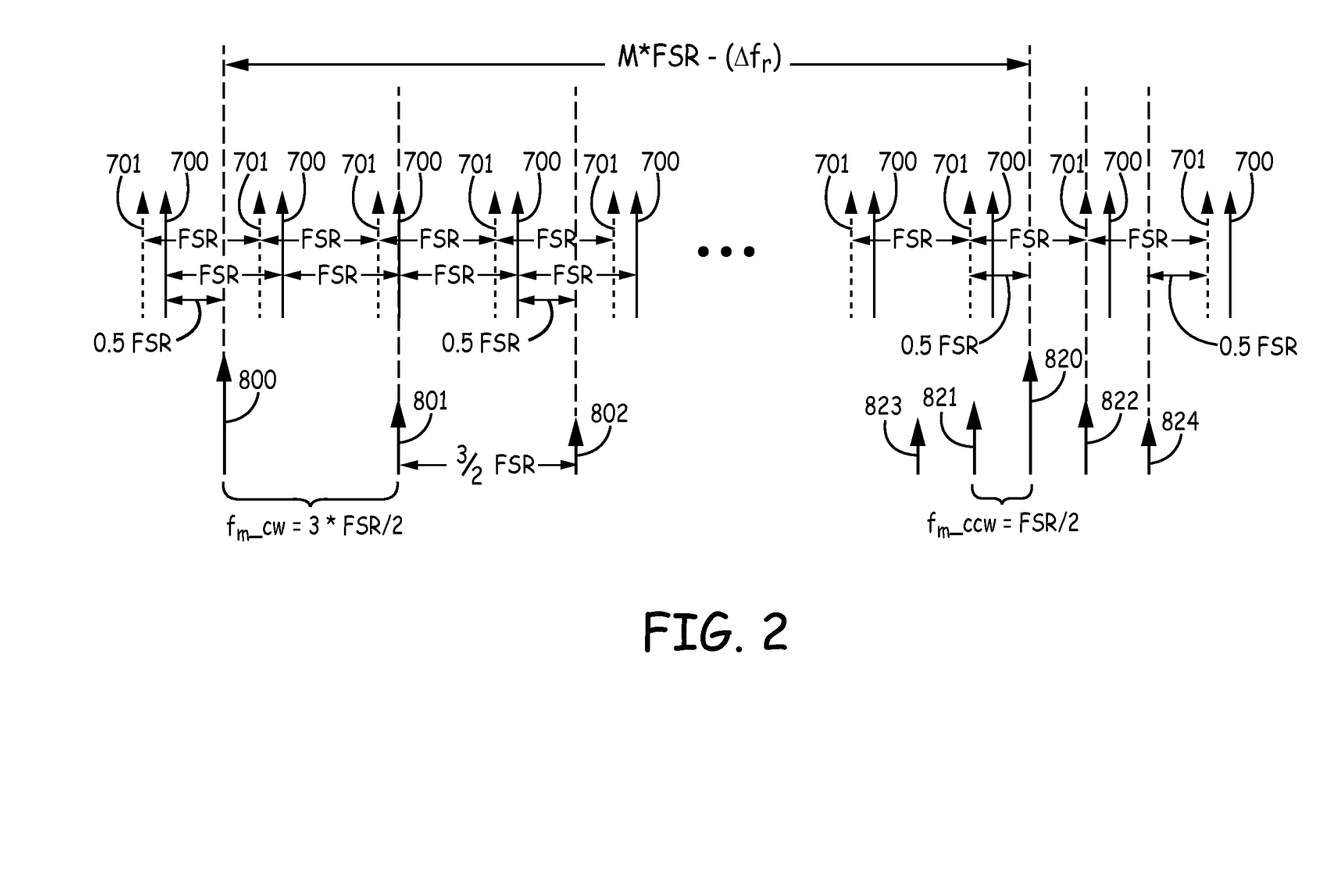
FIG. 2 shows exemplary vector arrows representing the frequency and amplitude of optical signals relative to resonance peaks of a gyro sensing resonator in accordance with the present application.

FIG. 2 shows exemplary vector arrows representing the frequency and amplitude of optical signals relative to resonance peaks of a gyro sensing resonator in accordance with the present application. The exemplary relations between various frequencies is indicated by the vector arrows 800-802 and 820-824. The CW resonance peaks of a gyro sensing resonator 150 are represented generally as solid vector arrows 700 and the CCW resonance peaks of a gyro sensing resonator 150 are represented generally as dashed vector arrows 701. The frequency difference between neighboring vector arrows 700 and 701 is $\Delta f_r$ which is proportional to the rotation rate of the gyro sensing resonator 150.

The frequency and amplitude of the carrier at frequency $f_1$ of the CW optical signal, represented generally as the vector arrow 800, is shown locked between two CW resonance peaks 700 of the gyro sensing resonator 150. Likewise, the frequency and amplitude of the carrier at frequency $f_2$ of the CCW optical signal represented generally as the vector arrow 820 is shown locked between two CCW resonance peaks 710 of the gyro sensing resonator 150.

In this exemplary case shown in FIG. 2, the carrier 800 of the CW optical signal 126 (FIG. 1) is modulated at 1.5 times the FSR of the gyro sensing resonator 150 (e.g., (n+0.5)FSR where n=1). The modulation generates sidebands. The first order upper sideband represented generally at 801 and the second order upper sideband represented generally at 802 are shown in FIG. 2. Since the carrier 800 of the CW optical signal 126 (FIG. 1) is modulated at 1.5 times the FSR of the gyro sensing resonator 150 the first order upper sideband 801 is offset from the carrier 800 by 1.5 times the FSR and the second order upper sideband 802 is offset from the carrier 800 by 3 times the FSR.

In this exemplary case shown in FIG. 2, the carrier 820 of the CCW optical signal 125 (FIG. 1) is modulated at 0.5 times the FSR of the gyro sensing resonator 150 (e.g., (p+0.5)FSR where p equals 0). Thus, as shown in FIG. 2, the carrier 820 of the CCW optical signal 125 (FIG. 1) is modulated at 0.5 times the FSR of the gyro sensing resonator 150. The modulation generates first and second order, upper and lower sidebands about the optical carrier 820. The carrier 820 of the CCW optical signal 125 (FIG. 1) is offset from the first lower sideband represented generally at 821 by ½ FSR and from the first upper sideband represented generally at 822 by ½ FSR. The carrier 820 of the CCW optical signal 125 is offset from the second lower sideband represented generally at 823 by a single FSR and from the second upper sideband represented generally at 824 by a single FSR.

The carrier 820 of the CCW optical signal 125 (FIG. 1) is separated in frequency from the carrier 800 of the CW optical signal 126 (FIG. 1) by (M*FSR−$f_r$), where $f_r$ is proportional to the rotation rate of the gyroscope resonator 150, and where M is much greater than n, and M is much greater than p. The symbol * is used herein to indicate multiplication. M is selected substantially large so that there are no overlaps in frequency of the CW and CCW carriers and the sidebands. Specifically, the CW beam and the CCW beam have negligible energy at the same optical frequency, which is referred to herein as "no overlap in frequencies of the CW and CCW sidebands and carriers. Thus, the interference between any back reflection on the CW beam 126 and the CCW beam 125 or between any back reflection on the CCW beam 125 and the CW beam 126 can be easily filtered out. Other modulation frequencies can be selected to provide a condition of no significant overlap of the carrier and sideband frequencies of the CW and CCW beams.

To measure the frequency difference $\Delta f = f_2 - f_1$ between the CW and CCW carrier frequency, a coupler 109 combines a small fraction of CW light 126 from laser 106 (tapped by coupler 108) with a small fraction of CCW light 125 from laser 105 (tapped by coupler 107), and directs them to a high bandwidth photodetector 119. The beat signal is analyzed by the processing unit 259, which determines the frequency difference $\Delta f = f_2 - f_1$. The rotation rates are calculated from the Sagnac frequency shift $\Delta f_r$ through relation $\Delta f = f_2 - f_1 = M*FSR - \Delta f_r$, since the $FSR = fm\_cw/(n+0.5)$ and integer number M are preselected.

Referring back to FIG. 1, the optical beam 126 output from the CW laser 106 propagates clockwise through the gyro resonator 150 and passes, via the CW transmission port 151, through the circulator 113 to the CW transmission detector 115. The CW optical beam 126 from CW laser 106 is transmitted through gyro resonator 150 to reach transmission detector 115. A large portion of the optical beam 126 from the CW laser 106 that enters port 152 does not enter gyro resonator 150 and therefore is not transmitted through gyro resonator 150, but rather goes directly to CW reflection port 154, to be incident on the CW reflection detector 118. The portion of the optical beam that entered the gyro resonator 150 exits the gyro resonator 150 at reflection port 154 and interferes with the portion of the optical beam that did not enter the gyro resonator 150. The CW reflection detector 118 detects light from the CW reflection port 154 of the gyro resonator 150. Output from the CW reflection detector 118 is input to the first-lock-in-amplifier 251. In one implementation of this embodiment, the two resonator couplers are 10% couplers, that that couple 10% of the light from ports 152 and 151 to the resonator coil 150. In another implementation of this embodiment, the two resonator couplers are 20% couplers that couple 20% of the light from ports 152 and 151 to the resonator coil 150.

The optical beam 125 output from the CCW laser 105 propagates counter-clockwise through the gyro resonator 150 and passes, via the CCW transmission port 152, through the circulator 114 to the CCW transmission detector 116. The optical beam 125 from CCW laser 105 must transmit through gyro resonator 150 to reach transmission detector 116. A portion of the optical beam from the CCW laser 105 that enters port 151 does not enter gyro resonator 150 and therefore does not transmit through gyro resonator 150, but rather goes directly to CCW reflection port 153 to be incident on the CCW reflection detector 117. A portion of the optical beam that entered the gyro resonator 150 exits the gyro resonator 150 at the CCW reflection port 153 and interferes with the portion of the optical beam that did not enter the resonator. The CCW reflection detector 117 detects light from the CCW reflection port 153 of the gyro resonator 150. Output from the CCW reflection detector 117 is input to the CCW fourth-lock-in-amplifier 254.

The reflection port signals typically have fast response to changes of input beam frequencies. High bandwidth resonance tracking loop can be achieved by using reflection port signals as feedback signals. However, the line shape of the resonance peak of the optical beam output at the transmission ports 151 and 152 typically have significantly better symmetry than the line shape of the resonance dip of the optical beam output from the reflection ports 153 and 154. The transmission port signals can be used to correct the bias errors induced in the resonance tracking loops. A first resonance tracking loop includes the third lock-in amplifier 253 and the CW resonance tracking (RT) servo 206 while a second resonance tracking loop includes the fifth lock-in amplifier 255 and the CCW resonance tracking servo 205, as shown in FIG. 1.

Figure 3A:
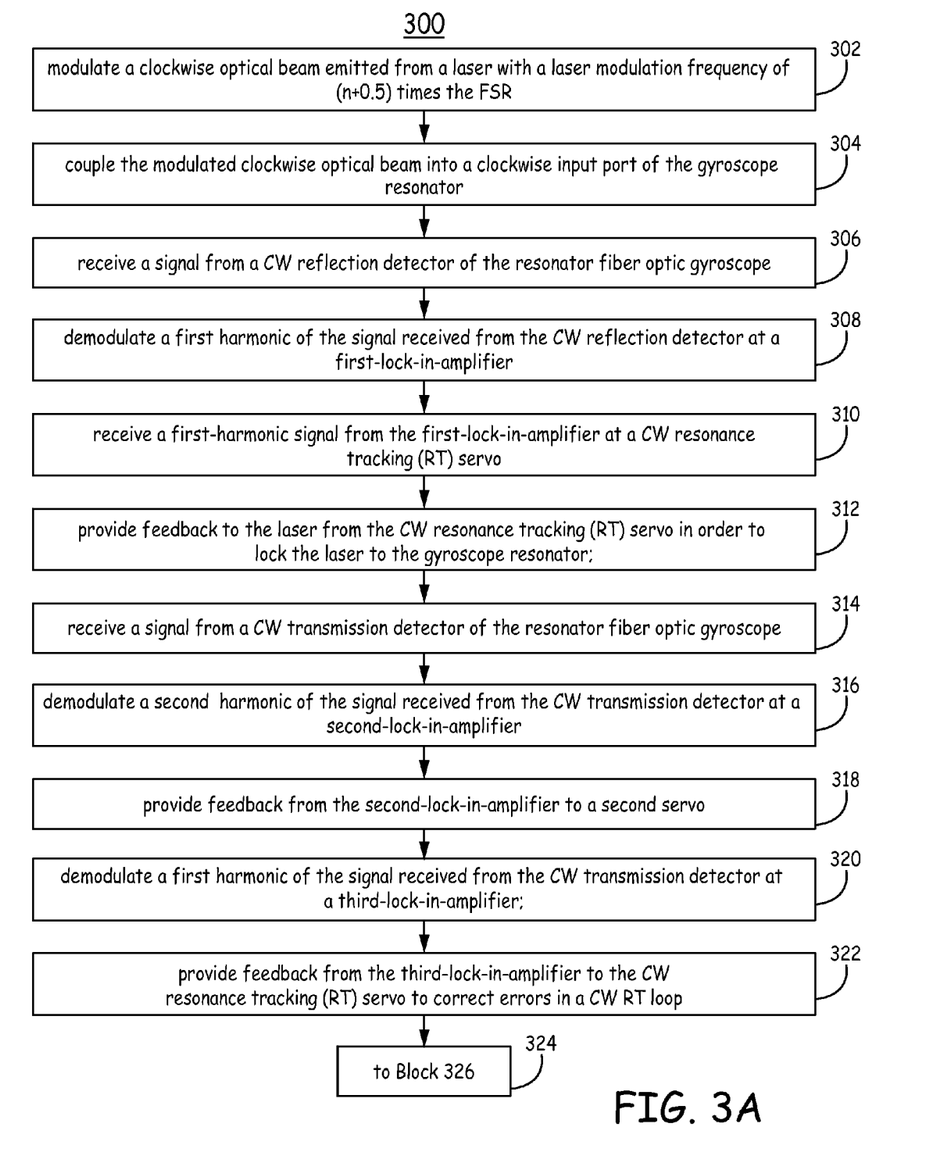
FIGS. 3A and 3B are flow diagrams of an embodiment of a method to lock a free spectral range (FSR) of a gyroscope resonator in a resonator fiber optic gyroscope and a laser modulation frequency of an optical beam coupled to an input port of the gyroscope resonator to each other in accordance with the present application.
Figure 3B:
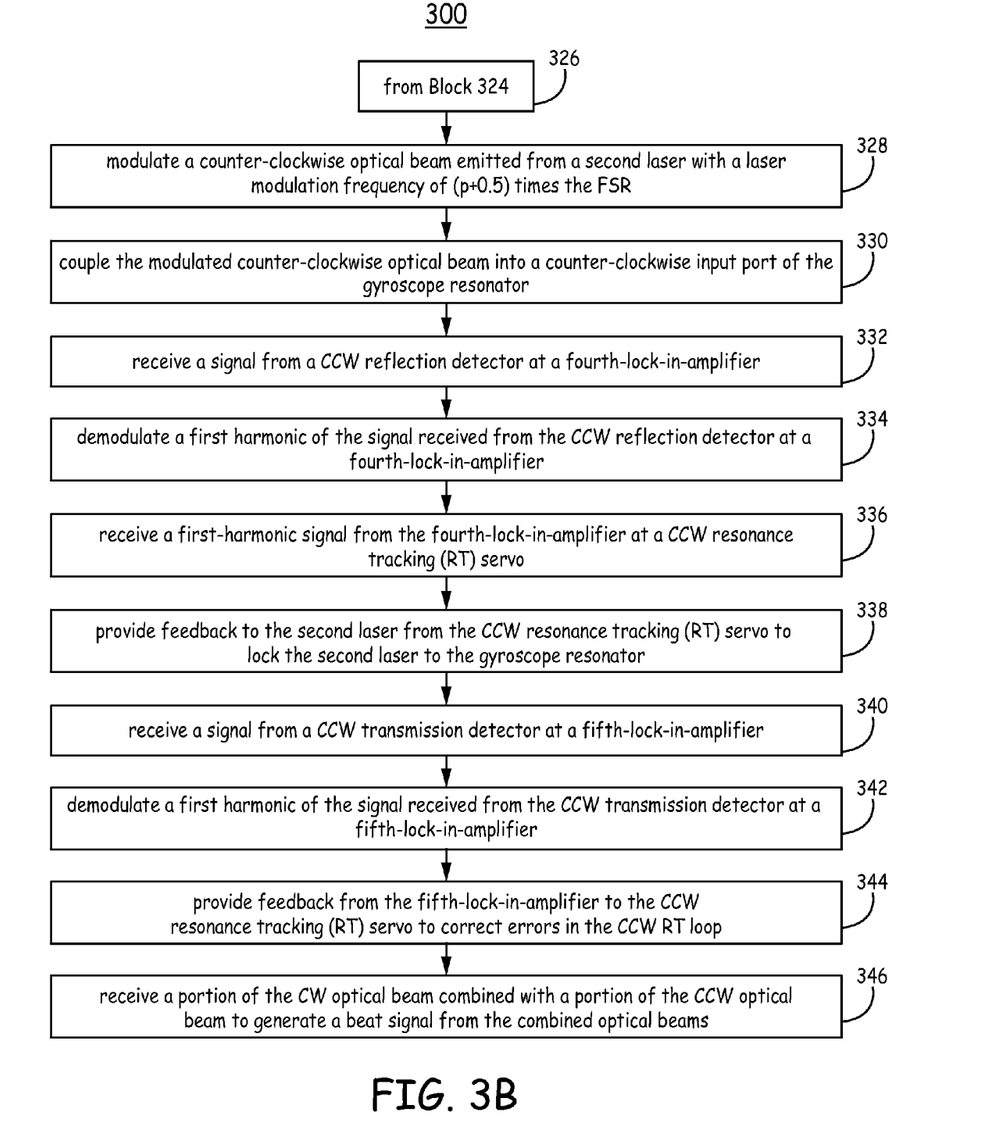

The operation of the RFOG system 10 is now described with reference to FIGS. 3A and 3B. FIGS. 3A and 3B are flow diagrams of an embodiment of a method 300 to lock a free spectral range (FSR) of a gyroscope resonator in a resonator fiber optic gyroscope and a laser modulation frequency of an optical beam coupled to an input port of the gyroscope resonator with respect to each other in accordance with the present application.

At block 302, a clockwise optical beam 126 emitted from a laser 106 is modulated with a laser modulation frequency of (n+0.5) times the FSR of the gyroscope resonator, where n is zero or a positive integer. At block 304, the modulated clockwise optical beam 126 is coupled into a clockwise input port 152 of the gyroscope resonator 150. The optical beam 126 output from the CW laser 106 propagates clockwise through the gyro resonator 150 and passes, via the CW transmission port 151, through the circulator 113 to the CW transmission detector 115. A large portion of the optical beam 126 from the CW laser 106 that enters port 152 does not enter gyro resonator 150 and therefore does not transmit through gyro resonator 150, but rather goes directly to CW reflection port 154, to be incident on the CW reflection detector 118. The CW reflection detector 118 detects light from the CW reflection port 154 of the gyro resonator 150. Output from the CW reflection detector 118 is input to the first-lock-in-amplifier 251.

At block 306, a signal 228 is received from a CW reflection detector 118 of the resonator fiber optic gyroscope system 10 at the first-lock-in-amplifier 251. At block 308, a first harmonic (n+0.5)FSR of the signal 228 received from the CW reflection detector 118 is demodulated at the first-lock-in-amplifier 251. At block 310, a demodulated first-harmonic signal 236 is received from the first-lock-in-amplifier 251 at a CW resonance tracking (RT) servo 206. At block 312, feedback 237 is provided to the first laser 106 from the CW RT servo 206 in order to lock the first laser 106 to the gyroscope resonator 150.

At block 314, a signal 229 is received from a CW transmission detector 115 of the resonator fiber optic gyroscope system 10 at a second-lock-in-amplifier 252 and at a third-lock-in-amplifier 253.

Figure 4:
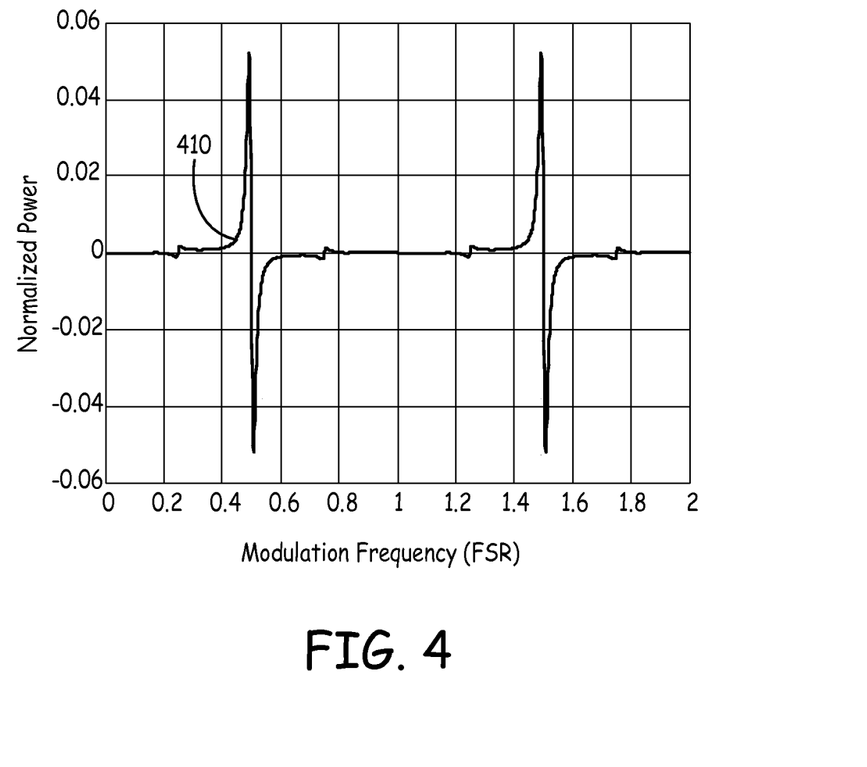
FIG. 4 shows a simulation of the normalized power of a demodulated signal output from the second-lock-in-amplifier in the RFOG system of FIG. 1 as a function of frequency.

At block 316, a second harmonic 2(n+0.5)FSR of the signal 229 received from the CW transmission detector 115 is demodulated at the second-lock-in-amplifier 252. At block 318, feedback 244 is provided from the second-lock-in-amplifier 252 to a second servo 257, which is the FSR servo 257 in the embodiment of FIG. 1. The FSR servo 257 drives a piezo-electric transducer 260 (also referred to herein as the piezo-electric device 260) for resonator length adjustment. FIG. 4 shows a simulation of the normalized power of a demodulated signal output from the second-lock-in-amplifier 252 in the RFOG system 10 of FIG. 1 as a function of modulation frequency. The simulation parameters are: fiber length 22 m; loss=5 dB/km; combined resonator coupler losses=5%; resonator coupler coupling ratios=96%; coil diameter=1.264 inches; modulation frequency=0.5 FSR; and the locking point is set to the mid-point between two resonance peaks. The plot 410 is the demodulated signal coming out of the second-lock-in-amplifier 252 and is provided as feedback 244 to the FSR servo 257 (block 318). The signal 244 goes to zero when modulation frequency fm_cw satisfies the relationship $fm\_cw = (n+0.5)FSR$. The FSR servo adjusts the resonator fiber length so that the FSR is kept at $fm\_cw/(n+0.5)$.

In the embodiment shown in FIG. 1, feedback 231 is provided from the FSR servo 257 to the piezo-electric device 260 based on the feedback 244 from the second-lock-in-amplifier 252. The length of the gyroscope resonator coil 150 is adjusted by driving the piezo-electric device 260 based on the feedback 231 received from FSR servo 257. The piezo-electric device 260 applies pressure or stretches the resonator coil 150 as is known to one skilled in the art. In addition to adjusting the fiber length through PZT, it is possible to control the FSR through temperature control of the resonator 150. In the embodiment shown in FIG. 1, a temperature control feedback signal 232 is provided from the FSR servo 257 to the gyroscope resonator 150 based on the feedback from the second-lock-in-amplifier 252. The temperature control signal 232 is used to stabilize the temperature of the gyroscope resonator 150 so that adjustments to the length of the gyroscope resonator 150 can be minimized or held to nearly a constant. In this manner, the FSR of the gyroscope resonator 150 is locked to the modulation frequency with relation of fm_cw=(n+0.5)FSR for the CW optical beam 126 through the second servo 257.

At block 320, a first harmonic (n+0.5)FSR of the signal 229 received from the CW transmission detector 115 is demodulated at the third-lock-in-amplifier 253. At block 322, feedback 238 is provided from the third-lock-in-amplifier 253 to the CW RT servo 206 to correct errors in the CW resonance tracking loop. The optical beam 127 detected by the CW transmission detector 115 at the CW transmit port 151 contains much less light from mismatched polarization and spatial modes than the optical beam 128 emitted the CW reflection port 154 since the optical beam 127 has been transmitted through the resonator 150. Therefore, the optical beam 127 is pure (i.e., has fewer light components that cause gyro errors). Thus, the demodulation of the optical beam 127 emitted from the CW transmit port 151 is used to correct errors in the CW resonance tracking loop by driving a bias point in the CW RT servo 206. This stabilizes the locking of the first laser 106 to the gyroscope resonator 150.

At block 324, the flow of method 300 is directed to block 326 in FIG. 3B. At block 326, the flow of method 300 is directed to block 328 in FIG. 3B.

At block 328, a counter-clockwise optical beam 125 emitted from a second laser 105 is modulated with a modulation frequency of (p+0.5) times the FSR. As noted above, p is zero or a positive integer and p does not equal n. At block 330, the modulated counter-clockwise optical beam 125 is coupled into the counter-clockwise input port 151 of the gyroscope resonator 150.

At block 332, a signal 230 is received from a CCW reflection detector 117 of the resonator fiber optic gyroscope system 10 at the fourth-lock-in-amplifier 254. At block 334, a first harmonic of the signal 230 received from the CCW reflection detector 117 is demodulated at the fourth-lock-in-amplifier 254. At block 336, a demodulated first-harmonic signal 233 is received from the fourth-lock-in-amplifier 254 at a CCW resonance tracking servo 207. At block 338, feedback 234 is provided to the second laser 105 from the CCW RT servo 207 to lock the second laser 105 to the gyroscope resonator 150.

At block 340, a signal 246 is received from the CCW transmission detector 116 of the resonator fiber optic gyroscope system 10 at the fifth-lock-in-amplifier 255. The optical beam 129 output from the CCW transmit port 152 is detected by the CCW transmission detector 116.

At block 342, a first harmonic at (p+0.5)FSR of the signal 246 received from the CCW transmission detector 116 is demodulated at the fifth-lock-in-amplifier 255. At block 344, feedback from the fifth-lock-in-amplifier 255 is provided to the CCW RT servo 207 to correct errors in the CCW RT loop. The demodulation of the optical beam 129 detected by the detector 116 is used to correct errors in the CCW resonance tracking loop by driving a bias point in the CCW RT servo 207. This stabilizes the locking of the second laser 105 to the gyroscope resonator 150.

In this manner, the FSR corresponding to the resonator round trip length is locked through the FSR servo 257 to the modulation frequency of the CW optical beam 126 emitted from the first laser 106. The first laser 106 is modulated by a precision modulation frequency source. Additionally, the modulation frequency of the CCW optical beam 125 emitted from the second laser 105 is locked to the FSR. Unlike prior art RFOG architectures, the technique described herein does not need to measure the FSR of the gyroscope resonator 150 to calculate the rotation rate. All error terms related to a change in FSR of the gyroscope resonator 150 are removed. Specifically, since the FSR can be obtained from the modulation frequency of the first laser 106, the influence of the FSR on rotation rate measurement can be easily subtracted out.

At the last block 346, a portion of the clockwise optical beam combined with a portion of the counter-clockwise optical beam is received a photodetector 119. Information indicative of a beat signal generated from the combined optical beams is output from the photodetector 119. The processing unit calculates a rotation rate $f_r$ based on, at least, the beat signal from the photodetector 119. As shown in FIG. 1, a fraction of CW light 126 and CCW light 125 are tapped from the laser outputs and combined at a high bandwidth detector 119 to determine the carrier frequency difference $\Delta f$ between the CW beam 126 and CCW beam 125. The rotation rate is then calculated using relation $\Delta f = M*FSR + \Delta f_r$, where $\Delta f_r$ is the rotation induced CW and CCW resonance frequency shift.

Figure 5:
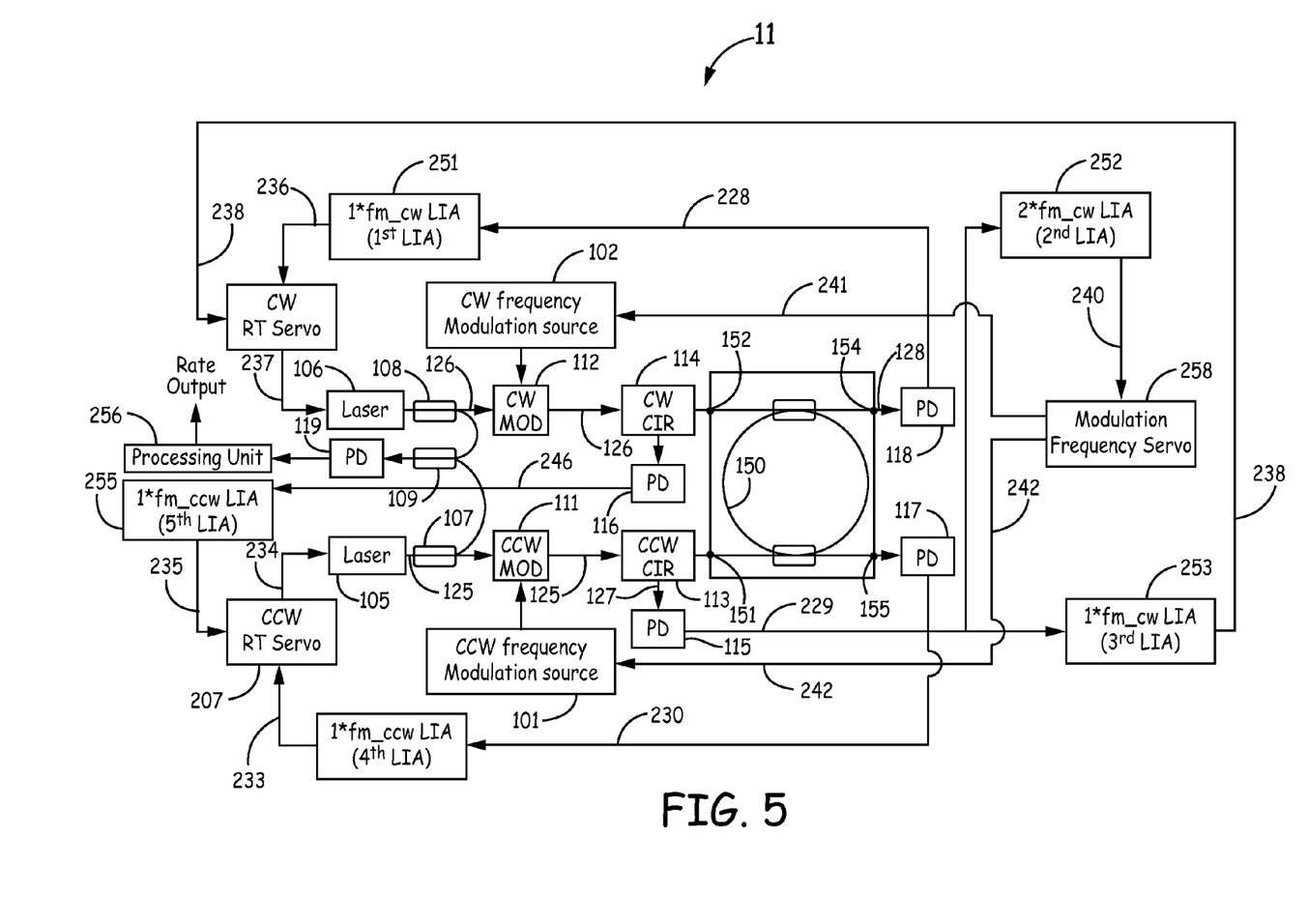
FIG. 5 is a block diagram of one embodiment of a Resonator Fiber Optic Gyroscope (RFOG) system with two lasers in accordance with the present application.

FIG. 5 is a block diagram of one embodiment of a Resonator Fiber Optic Gyroscope (RFOG) system 11 with two lasers 105 and 106 in accordance with the present application. The RFOG system 11 adjusts the modulation frequency of the CW optical beam 126 and the CW optical beam 125 as required to lock to the FSR of the gyroscope resonator 150. Specifically, the RFOG 11 is configured so the modulation frequency of the CCW optical beam 125 is adjusted as required to lock to a CCW frequency modulation fm_ccw equal to (p+0.5)FSR and, at the same time, the modulation frequency of the CW optical beam 126 is adjusted as required to lock to a CW frequency modulation fm_cw equal to (n+0.5)FSR, where n and p are zero or a positive integer, and p does not equal n.

The lasers 105 and 106 are tunable lasers. High bandwidth resonance tracking loops control the relative laser frequency noise between the lasers 105, 106 and the resonator by stabilizing the lasers 105 and 106 to the gyro sensing resonator. The free spectral range (FSR) of a gyroscope resonator 150 in the RFOG system 10 and a laser modulation frequency of an optical beam 126 coupled to an input port 152 of the gyroscope resonator 150 are locked to each other.

The RFOG system 11 includes a counter-clockwise (CCW) laser 105, a clockwise (CW) laser 106, a CCW modulator 111, a CW modulator 112, circulators 113 and 114, a gyroscope resonator 150 with ports 151-154, photodetectors 115, 116, 117, 118, and 119, a first-lock-in amplifier 251, a second-lock-in amplifier 252, a third-lock-in amplifier 253, a fourth-lock-in amplifier 254, a fifth-lock-in amplifier 255, a CW resonance tracking servo 206, a CCW resonance tracking servo 207, a modulation-frequency servo 258, couplers 107, 108, and 109, and a processing unit 259. The RFOG system 11 also includes a clockwise tunable modulation generator 102 to drive the clockwise modulator 112 and a counter-clockwise tunable modulation 101 to drive the counter-clockwise modulator 111.

If the lasers 105 and 106 are frequency modulated, the clockwise tunable modulation generator 102 is also referred to herein as "CW frequency modulation source 102" used to drive a CW frequency modulator 112. Likewise, the counter-clockwise tunable modulation 101 is also referred to herein as "CCW frequency modulation source 101" used to drive a CCW frequency modulator 111.

If the lasers 105 and 106 are phase modulated, the clockwise tunable modulation generator 102 is also referred to herein as "CW phase modulation source 102" used to drive a CW phase modulator 112. Likewise, the counter-clockwise tunable modulation 101 is also referred to herein as "CCW phase modulation source 102" used to drive a CCW phase modulator 111.

The RFOG system 11 differs from the RFOG system 10 of FIG. 1 in that the second servo is a modulation-frequency servo 258 rather than a FSR servo 257. There is no piezo-electric device (PZT) 260 used to control the length of the FSR of the gyroscope resonator 150 in the RFOG system 11. Instead, the modulation-frequency servo 258 provides feedback signals 241 and 242 to CW frequency modulation source 102 and CCW frequency modulation source 101, respectively. The CW frequency modulation source 102 is a precise frequency modulation source that modulates the CW optical beam 126 emitted from the CW laser 106. The CCW frequency modulation source 101 is a precise frequency modulation source that modulates the CCW optical beam 125 emitted from the CCW laser 105.

When the FSR of the gyroscope resonator 150 shifts due to environmental changes, the CW frequency modulation source 102 adjusts the modulation frequency of the CW laser 106 based on the feedback signal 241. The modulation-frequency servo 258 locks the CW modulation frequency to (n+0.5)FSR, where n is zero or a positive integer. Likewise, when the FSR of the gyroscope resonator 150 shifts, the CCW frequency modulation source 101 also adjusts the modulation frequency of the CCW laser 105 based on the feedback signal 242. The modulation-frequency servo 258 locks the CCW modulation frequency to (p+0.5)FSR, where p is zero or a positive integer that not equal to m.

The clockwise resonance tracking loop in the RFOG system 11 is the same as the clockwise resonance tracking loop in the RFOG system 10. The counter-clockwise resonance tracking loop in the RFOG system 11 is the same as the counter-clockwise resonance tracking loop in the RFOG system 10.

The method 300 of FIGS. 3A and 3B is implemented in the RFOG system 11 as follows. At block 318, feedback 240 is provided from the second-lock-in-amplifier 252 to a second servo 258, which is the modulation-frequency servo 258 in the embodiment of FIG. 5. The modulation-frequency servo 258 provides feedback 241 to the CW tunable modulation generator 102 based on the feedback 240 from the second-lock-in-amplifier 252. CW tunable modulation generator 102 adjusts the modulation frequency of the CW optical beam 126 as the FSR changes in order to lock the modulation frequency of the CW optical beam 126 to the (n+0.5)FSR.

The modulation-frequency servo 258 also provides feedback to the CCW tunable modulation generator 101 based on the feedback 240 from the second-lock-in-amplifier 252. The CCW tunable modulation generator 101 adjusts the modulation frequency of the CCW optical beam 125 as the FSR changes to lock the modulation frequency of the CCW optical beam 125 to (p+0.5)FSR. In this manner, the modulation frequency (n+0.5)FSR of the CW optical beam 126 is locked to the FSR of the gyroscope resonator 150 through the second servo 258. a second servo 257, which is the The embodiments of systems described herein allow for selection of modulation frequencies at substantially high values so that laser RIN noise and phase noise are substantially attenuated by the filtering effect of the sensing coil.

Example Embodiments

Example 1 includes a resonator fiber optic gyroscope system, comprising: a gyroscope resonator having a clockwise input port and a counter-clockwise input port and a free spectral range (FSR) corresponding to the resonator round trip length; a laser configured to couple a clockwise optical beam into to the clockwise input port; a clockwise modulator to impose a modulation frequency equivalent to (n+0.5) times the FSR on the clockwise optical beam before the clockwise optical beam is coupled into the clockwise input port, where n is zero or a positive integer; a clockwise circulator; a clockwise reflection detector to detect the clockwise optical beam output from a clockwise reflection port; a first-lock-in-amplifier to receive a signal from the clockwise reflection detector, wherein the first-lock-in-amplifier demodulates at the first harmonic of the modulation frequency of the clockwise optical beam; a clockwise-resonance-tracking servo to receive output from the first-lock-in-amplifier and to provide feedback to the laser to lock the laser to the gyroscope resonator; a clockwise transmission detector to detect an optical beam output from the counter-clockwise input port; a second servo; a second-lock-in-amplifier to receive a signal from the clockwise transmission detector, wherein the second-lock-in-amplifier demodulates at the second harmonic of the modulation frequency of the clockwise optical beam and provides feedback to the second servo; and a third-lock-in-amplifier to receive a signal from the clockwise transmission detector, wherein the third-lock-in-amplifier demodulates at the first harmonic of the modulation frequency of the clockwise optical beam and provides feedback to the clockwise-resonance-tracking servo to correct errors in a clockwise resonance tracking loop, wherein one of: the modulation frequency of the clockwise optical beam is locked to (n+0.5) times the FSR through the second servo, where n is zero or a positive integer; or the FSR is locked to 1/(n+0.5) times the modulation frequency of the clockwise optical beam through the second servo.

Example 2 includes the resonator fiber optic gyroscope system of Example 1, wherein the laser is a first laser, further comprising: a second laser configured to couple a counter-clockwise optical beam into to the counter-clockwise input port; a counter-clockwise modulator to impose a modulation frequency equivalent to (p+0.5) times the FSR on the counter-clockwise optical beam before the counter-clockwise optical beam is coupled into the counter-clockwise input port, where p is zero or a positive integer and where p does not equal n; a counter-clockwise circulator; a counter-clockwise reflection detector to detect the counter-clockwise optical beam output from a counter-clockwise reflection port; a fourth-lock-in-amplifier to receive a signal from the counter-clockwise reflection detector, wherein the fourth-lock-in-amplifier demodulates at the first harmonic of the modulation frequency of the counter-clockwise optical beam; a counter-clockwise-resonance-tracking servo to receive output from the fourth-lock-in-amplifier and to provide feedback to the second laser to lock the second laser to the gyroscope resonator; a counter-clockwise transmission detector to detect an optical beam output from the clockwise input port; and the fifth-lock-in-amplifier to receive a signal from the counter-clockwise transmission detector, wherein the fifth-lock-in-amplifier demodulates at the first harmonic of the modulation frequency of the counter-clockwise optical beam and provides feedback to the counter-clockwise-resonance-tracking servo to correct errors in a counter-clockwise resonance tracking loop.

Example 3 includes the resonator fiber optic gyroscope system of Example 2, wherein the second servo is a free-spectral-range (FSR) servo, the resonator fiber optic gyroscope system further comprising: a piezo-electric device to input feedback from the FSR servo, wherein a length of a gyroscope resonator coil is changed by the piezo-electric device to adjust the FSR of the gyroscope resonator in order to lock the FSR in relation to the modulation frequency of the clockwise optical beam.

Example 4 includes the resonator fiber optic gyroscope system of Example 3, wherein FSR servo further provides a temperature control signal to the gyroscope resonator based on the feedback from the second-lock-in-amplifier.

Example 5 includes the resonator fiber optic gyroscope system of any of Examples 2-4, wherein the second servo is a modulation-frequency servo, the resonator fiber optic gyroscope system further comprising: a clockwise tunable modulation generator to drive the clockwise modulator; and a counter-clockwise tunable modulation generator to drive the counter-clockwise modulator, wherein the clockwise tunable modulation generator receives feedback from the modulation-frequency servo to adjust the modulation frequency of the clockwise optical beam as the FSR changes in order to lock the modulation frequency of the clockwise optical beam to the (n+0.5)FSR, and wherein the counter-clockwise tunable modulation generator receives feedback from the modulation-frequency servo to adjust the modulation frequency of the counter-clockwise optical beam as the FSR changes in order to lock the modulation frequency of the counter-clockwise optical beam to (p+0.5)FSR.

Example 6 includes the resonator fiber optic gyroscope system of any of Examples 1-5, wherein the second servo is a FSR servo, the resonator fiber optic gyroscope system further comprising: a piezo-electric device to input feedback from the FSR servo, wherein a length of a gyroscope resonator coil is changed by the piezo-electric device to adjust the FSR of the gyroscope resonator in order to lock the FSR in relation to the modulation frequency of the clockwise optical beam.

Example 7 includes the resonator fiber optic gyroscope system of any of Examples 1-6, wherein the second servo is a modulation-frequency servo, the resonator fiber optic gyroscope system further comprising: a clockwise tunable modulation generator configured to drive the clockwise phase modulator, wherein the clockwise tunable modulation generator receives feedback from the modulation-frequency servo to adjust the modulation frequency of the clockwise optical beam as the FSR changes in order to lock the modulation frequency of the clockwise optical beam to the (n+0.5) FSR.

Example 8 includes the resonator fiber optic gyroscope system of any of Examples 1-7, further comprising: a photodetector to receive a portion of the clockwise optical beam combined with a portion of the counter-clockwise optical beam to generate a beat signal from the combined optical beams; and a processing unit to calculate a rotation rate based on at least the beat signal.

Example 9 includes a method of locking a free spectral range (FSR) of a gyroscope resonator in a resonator fiber optic gyroscope system and a laser modulation frequency of an optical beam coupled to an input port of the gyroscope resonator to each other, the method comprising: modulating a clockwise optical beam emitted from a laser with a laser modulation frequency of (n+0.5) times the FSR, where n is zero or a positive integer; coupling the modulated clockwise optical beam into a clockwise input port of the gyroscope resonator; receiving a signal from a clockwise reflection detector; demodulating a first harmonic of the signal received from the clockwise reflection detector at a first-lock-in-amplifier; receiving a demodulated first-harmonic signal from the first-lock-in-amplifier at a clockwise-resonance-tracking servo; providing feedback to the laser from the clockwise-resonance-tracking servo in order to lock the laser to the gyroscope resonator; receiving a signal from a clockwise transmission detector; demodulating a second harmonic of the signal received from the clockwise transmission detector at a second-lock-in-amplifier; providing feedback from the second-lock-in-amplifier to a second servo; demodulating a first harmonic of the signal received from the clockwise transmission detector at a third-lock-in-amplifier; and providing feedback from the third-lock-in-amplifier to the clockwise-resonance-tracking servo to correct errors in a clockwise resonance tracking loop.

Example 10 includes the method of Example 9, wherein the laser is a first laser, the method further comprising: modulating a counter-clockwise optical beam emitted from a second laser with a laser modulation frequency of (p+0.5) times the FSR, where p is zero or a positive integer and p does not equal n; coupling the modulated counter-clockwise optical beam into a counter-clockwise input port of the gyroscope resonator; receiving a signal from a counter-clockwise reflection detector at a fourth-lock-in-amplifier; demodulating a first harmonic of the signal received from the counter-clockwise reflection detector at the fourth-lock-in-amplifier; receiving a demodulated first-harmonic signal from the fourth-lock-in-amplifier at a counter-clockwise-resonance-tracking servo; and providing feedback to the second laser from the counter-clockwise-resonance-tracking servo to lock the second laser to the gyroscope resonator.

Example 11 includes the method of Example 10, further comprising: receiving a signal from counter-clockwise transmission detector at a fifth-lock-in-amplifier; demodulating a first harmonic of the signal received from the counter-clockwise transmission detector at the fifth-lock-in-amplifier; and providing feedback from the fifth-lock-in-amplifier to the counter-clockwise-resonance-tracking servo to correct errors in the counter-clockwise resonance tracking loop.

Example 12 includes the method of any of Examples 10-11, wherein the second servo is a FSR servo, the method further comprising: providing feedback from the FSR servo to a piezo-electric device based on the feedback from the second-lock-in-amplifier; adjusting a length of a gyroscope resonator coil by driving the piezo-electric device based on the feedback received at the FSR device; and locking the FSR to 1/(n+0.5) times the modulation frequency of the clockwise optical beam through the adjustment to the length of the gyroscope resonator coil.

Example 13 includes the method of Example 12, further comprising: providing a temperature control signal to the gyroscope resonator from the FSR servo based on the feedback from the second-lock-in-amplifier.

Example 14 includes the method of any of Examples 10-13, wherein the second servo is a modulation-frequency servo, the method further comprising: providing feedback from the modulation-frequency servo to a clockwise tunable modulation generator based on the feedback from the second-lock-in-amplifier; adjusting the modulation frequency of the clockwise optical beam as the FSR changes to lock the modulation frequency of the clockwise optical beam to the (n+0.5) FSR; providing feedback from the modulation-frequency servo to a counter-clockwise tunable modulation generator based on the feedback from the second-lock-in-amplifier; and adjusting the modulation frequency of the counter-clockwise optical beam as the FSR changes to lock the modulation frequency of the counter-clockwise optical beam to (p+0.5) FSR.

Example 15 includes the method of any of Examples 9-14, wherein the second servo is a FSR servo, the method further comprising: providing feedback from the FSR servo to a piezo-electric device based on the feedback from the second-lock-in-amplifier; adjusting a length of a gyroscope resonator coil by implementing the piezo-electric device based on the feedback received at the piezo-electric device; and locking the FSR to the modulation frequency of the clockwise optical through the adjustment to the length of the gyroscope resonator coil.

Example 16 includes the method of Example 15, further comprising: providing a temperature control signal to the gyroscope resonator from the FSR servo based on the feedback from the second-lock-in-amplifier.

Example 17 includes the method of any of Examples 9-16, wherein the second servo is a modulation-frequency servo, the resonator fiber optic gyroscope further comprises: providing feedback from the modulation-frequency servo to a clockwise tunable modulation generator based on the feedback from the second-lock-in-amplifier; adjusting the modulation frequency of the clockwise optical beam as the FSR changes to lock the modulation frequency of the clockwise optical beam to the (n+0.5)FSR; providing feedback from the modulation-frequency servo to a counter-clockwise tunable modulation generator based on the feedback from the second-lock-in-amplifier; and adjusting the modulation frequency of the counter-clockwise optical beam as the FSR changes to lock the modulation frequency of the counter-clockwise optical beam to (p+0.5)FSR.

Example 18 includes a resonator fiber optic gyroscope system, comprising: a gyroscope resonator having a clockwise input port and a counter-clockwise input port and a free spectral range (FSR) corresponding to the resonator round trip length; a first laser configured to couple a clockwise optical beam into to the clockwise input port; a clockwise modulator to impose a modulation frequency equivalent to (n+0.5) times the FSR on the clockwise optical beam before the clockwise optical beam is coupled into the clockwise input port, where n is a positive integer; a clockwise circulator; a clockwise reflection detector to detect the clockwise optical beam output from a clockwise reflection port; a first-lock-in-amplifier to receive a signal from the clockwise reflection detector, wherein the first-lock-in-amplifier demodulates at the first harmonic of the modulation frequency of the clockwise optical beam; a clockwise-resonance-tracking servo to receive output from the first-lock-in-amplifier and to provide feedback to the first laser to lock the first laser to the gyroscope resonator; a clockwise transmission detector to detect an optical beam output from the counter-clockwise input port; a second servo; a second-lock-in-amplifier to receive a signal from the clockwise transmission detector, wherein the second-lock-in-amplifier demodulates at the second harmonic of the modulation frequency of the clockwise optical beam and provides feedback to the second servo; a third-lock-in-amplifier to receive a signal from the clockwise transmission detector, wherein the third-lock-in-amplifier demodulates at the first harmonic of the modulation frequency of the clockwise optical beam and provides feedback to the clockwise-resonance-tracking servo to correct errors in a clockwise resonance tracking loop, a second laser configured to couple a counter-clockwise optical beam into to the counter-clockwise input port; a counter-clockwise modulator to impose a modulation frequency equivalent to (p+0.5) times the FSR on the counter-clockwise optical beam before the counter-clockwise optical beam is coupled into the counter-clockwise input port, where p is zero or a positive integer and where p does not equal n; a counter-clockwise circulator; a counter-clockwise reflection detector to detect the counter-clockwise optical beam output from a counter-clockwise reflection port; a fourth-lock-in-amplifier to receive a signal from the counter-clockwise reflection detector, wherein the fourth-lock-in-amplifier demodulates at the first harmonic of the modulation frequency of the counter-clockwise optical beam; a counter-clockwise-resonance-tracking servo to receive output from the fourth-lock-in-amplifier and to provide feedback to the second laser to lock the second laser to the gyroscope resonator; a counter-clockwise transmission detector to detect an optical beam output from the clockwise input port; and the fifth-lock-in-amplifier to receive a signal from the counter-clockwise transmission detector, wherein the fifth-lock-in-amplifier demodulates at the first harmonic of the modulation frequency of the counter-clockwise optical beam and provides feedback to the counter-clockwise-resonance-tracking servo to correct errors in a counter-clockwise resonance tracking loop, wherein one of: the modulation frequency of the clockwise optical beam is locked to the (n+0.5)FSR through the second servo; or the FSR is locked to 1/(n+0.5) times the modulation frequency of the clockwise optical beam through the second servo.

Example 19 includes the resonator fiber optic gyroscope system of Example 18, wherein the second servo is a FSR servo, the resonator fiber optic gyroscope system further comprising: a piezo-electric device to input feedback from the FSR servo, wherein a length of a gyroscope resonator coil is changed by the piezo-electric device to adjust the FSR of the gyroscope resonator based on the feedback from the FSR servo to lock the FSR in relation to the modulation frequency of the clockwise optical beam.

Example 20 includes the resonator fiber optic gyroscope system of any of Examples 18-19, wherein the second servo is a modulation-frequency servo, the resonator fiber optic gyroscope system further comprising: a clockwise tunable modulation generator to drive the clockwise phase modulator; and a counter-clockwise modulation to drive the counter-clockwise phase modulator, wherein the clockwise tunable modulation generator receives feedback from the modulation-frequency servo to adjust the modulation frequency of the clockwise optical beam as the FSR changes, wherein the modulation frequency of the clockwise optical beam is locked to the (n+0.5)FSR, and wherein the counter-clockwise tunable modulation generator receives feedback from the modulation-frequency servo to adjust the modulation frequency of the counter-clockwise optical beam as the FSR changes, wherein the modulation frequency of the counter-clockwise optical beam is locked to (p+0.5)FSR.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present application. Therefore, it is manifestly intended that this invention be limited only by the claims and the equivalents thereof.

What is claimed is:

1. A resonator fiber optic gyroscope system, comprising:
a gyroscope resonator having a clockwise input port and a counter-clockwise input port and a free spectral range (FSR) corresponding to the resonator round trip length;
a laser configured to couple a clockwise optical beam into to the clockwise input port;
a clockwise modulator to impose a modulation frequency equivalent to (n+0.5) times the FSR on the clockwise optical beam before the clockwise optical beam is coupled into the clockwise input port, where n is zero or a positive integer;
a clockwise circulator;
a clockwise reflection detector to detect the clockwise optical beam output from a clockwise reflection port;
a first-lock-in-amplifier to receive a signal from the clockwise reflection detector, wherein the first-lock-in-amplifier demodulates at the first harmonic of the modulation frequency of the clockwise optical beam;
a clockwise-resonance-tracking servo to receive output from the first-lock-in-amplifier and to provide feedback to the laser to lock the laser to the gyroscope resonator;
a clockwise transmission detector to detect an optical beam output from the counter-clockwise input port;
a second servo;
a second-lock-in-amplifier to receive a signal from the clockwise transmission detector, wherein the second-lock-in-amplifier demodulates at the second harmonic of the modulation frequency of the clockwise optical beam and provides feedback to the second servo; and
a third-lock-in-amplifier to receive a signal from the clockwise transmission detector, wherein the third-lock-in-amplifier demodulates at the first harmonic of the modulation frequency of the clockwise optical beam and provides feedback to the clockwise-resonance-tracking servo to correct errors in a clockwise resonance tracking loop,
wherein one of: the modulation frequency of the clockwise optical beam is locked to (n+0.5) times the FSR through the second servo, where n is zero or a positive integer; or the FSR is locked to 1/(n+0.5) times the modulation frequency of the clockwise optical beam through the second servo.

2. The resonator fiber optic gyroscope system of claim 1, wherein the laser is a first laser, further comprising:
a second laser configured to couple a counter-clockwise optical beam into to the counter-clockwise input port;
a counter-clockwise modulator to impose a modulation frequency equivalent to (p+0.5) times the FSR on the counter-clockwise optical beam before the counter-clockwise optical beam is coupled into the counter-clockwise input port, where p is zero or a positive integer and where p does not equal n;
a counter-clockwise circulator;
a counter-clockwise reflection detector to detect the counter-clockwise optical beam output from a counter-clockwise reflection port;
a fourth-lock-in-amplifier to receive a signal from the counter-clockwise reflection detector, wherein the fourth-lock-in-amplifier demodulates at the first harmonic of the modulation frequency of the counter-clockwise optical beam;
a counter-clockwise-resonance-tracking servo to receive output from the fourth-lock-in-amplifier and to provide feedback to the second laser to lock the second laser to the gyroscope resonator;
a counter-clockwise transmission detector to detect an optical beam output from the clockwise input port; and
the fifth-lock-in-amplifier to receive a signal from the counter-clockwise transmission detector, wherein the fifth-lock-in-amplifier demodulates at the first harmonic of the modulation frequency of the counter-clockwise optical beam and provides feedback to the counter-clockwise-resonance-tracking servo to correct errors in a counter-clockwise resonance tracking loop.

3. The resonator fiber optic gyroscope system of claim 2, wherein the second servo is a free-spectral-range (FSR) servo, the resonator fiber optic gyroscope system further comprising:
a piezo-electric device to input feedback from the FSR servo, wherein a length of a gyroscope resonator coil is changed by the piezo-electric device to adjust the FSR of the gyroscope resonator in order to lock the FSR in relation to the modulation frequency of the clockwise optical beam.

4. The resonator fiber optic gyroscope system of claim 3, wherein FSR servo further provides a temperature control signal to the gyroscope resonator based on the feedback from the second-lock-in-amplifier.

5. The resonator fiber optic gyroscope system of claim 2, wherein the second servo is a modulation-frequency servo, the resonator fiber optic gyroscope system further comprising:
a clockwise tunable modulation generator to drive the clockwise modulator; and
a counter-clockwise tunable modulation generator to drive the counter-clockwise modulator,
wherein the clockwise tunable modulation generator receives feedback from the modulation-frequency servo to adjust the modulation frequency of the clockwise optical beam as the FSR changes in order to lock the modulation frequency of the clockwise optical beam to the (n+0.5)FSR, and
wherein the counter-clockwise tunable modulation generator receives feedback from the modulation-frequency servo to adjust the modulation frequency of the counter-clockwise optical beam as the FSR changes in order to lock the modulation frequency of the counter-clockwise optical beam to the (p+0.5)FSR.

6. The resonator fiber optic gyroscope system of claim 1, wherein the second servo is a FSR servo, the resonator fiber optic gyroscope system further comprising:
a piezo-electric device to input feedback from the FSR servo, wherein a length of a gyroscope resonator coil is changed by the piezo-electric device to adjust the FSR of the gyroscope resonator in order to lock the FSR in relation to the modulation frequency of the clockwise optical beam.

7. The resonator fiber optic gyroscope system of claim 1, wherein the second servo is a modulation-frequency servo, the resonator fiber optic gyroscope system further comprising:
a clockwise tunable modulation generator configured to drive the clockwise phase modulator, wherein the clockwise tunable modulation generator receives feedback from the modulation-frequency servo to adjust the modulation frequency of the clockwise optical beam as the FSR changes in order to lock the modulation frequency of the clockwise optical beam to the (n+0.5) FSR.

8. The resonator fiber optic gyroscope system of claim 1, further comprising:

a photodetector to receive a portion of the clockwise optical beam combined with a portion of the counter-clockwise optical beam to generate a beat signal from the combined optical beams; and a processing unit to calculate a rotation rate based on at least the beat signal.

9. A method of locking a free spectral range (FSR) of a gyroscope resonator in a resonator fiber optic gyroscope system and a laser modulation frequency of an optical beam coupled to an input port of the gyroscope resonator to each other, the method comprising:

modulating a clockwise optical beam emitted from a laser with a laser modulation frequency of (n+0.5) times the FSR, where n is zero or a positive integer;

coupling the modulated clockwise optical beam into a clockwise input port of the gyroscope resonator;

receiving a signal from a clockwise reflection detector;

demodulating a first harmonic of the signal received from the clockwise reflection detector at a first-lock-in-amplifier;

receiving a demodulated first-harmonic signal from the first-lock-in-amplifier at a clockwise-resonance-tracking servo;

providing feedback to the laser from the clockwise-resonance-tracking servo in order to lock the laser to the gyroscope resonator;

receiving a signal from a clockwise transmission detector;

demodulating a second harmonic of the signal received from the clockwise transmission detector at a second-lock-in-amplifier;

providing feedback from the second-lock-in-amplifier to a second servo;

demodulating a first harmonic of the signal received from the clockwise transmission detector at a third-lock-in-amplifier; and providing feedback from the third-lock-in-amplifier to the clockwise-resonance-tracking servo to correct errors in a clockwise resonance tracking loop.

10. The method of claim 9, wherein the laser is a first laser, the method further comprising:

modulating a counter-clockwise optical beam emitted from a second laser with a laser modulation frequency of (p+0.5) times the FSR, where p is zero or a positive integer and p does not equal n;

coupling the modulated counter-clockwise optical beam into a counter-clockwise input port of the gyroscope resonator;

receiving a signal from a counter-clockwise reflection detector at a fourth-lock-in-amplifier;

demodulating a first harmonic of the signal received from the counter-clockwise reflection detector at the fourth-lock-in-amplifier;

receiving a demodulated first-harmonic signal from the fourth-lock-in-amplifier at a counter-clockwise-resonance-tracking servo; and providing feedback to the second laser from the counter-clockwise-resonance-tracking servo to lock the second laser to the gyroscope resonator.

11. The method of claim 10, further comprising:

receiving a signal from counter-clockwise transmission detector at a fifth-lock-in-amplifier;

demodulating a first harmonic of the signal received from the counter-clockwise transmission detector at the fifth-lock-in-amplifier; and providing feedback from the fifth-lock-in-amplifier to the counter-clockwise-resonance-tracking servo to correct errors in the counter-clockwise resonance tracking loop.

12. The method of claim 10, wherein the second servo is a FSR servo, the method further comprising:

providing feedback from the FSR servo to a piezo-electric device based on the feedback from the second-lock-in-amplifier;

adjusting a length of a gyroscope resonator coil by driving the piezo-electric device based on the feedback received at the FSR device; and locking the FSR to 1/(n+0.5) times the modulation frequency of the clockwise optical beam through the adjustment to the length of the gyroscope resonator coil.

13. The method of claim 12, further comprising:

providing a temperature control signal to the gyroscope resonator from the FSR servo based on the feedback from the second-lock-in-amplifier.

14. The method of claim 10, wherein the second servo is a modulation-frequency servo, the method further comprising:

providing feedback from the modulation-frequency servo to a clockwise tunable modulation generator based on the feedback from the second-lock-in-amplifier;

adjusting the modulation frequency of the clockwise optical beam as the FSR changes to lock the modulation frequency of the clockwise optical beam to the (n+0.5) FSR;

providing feedback from the modulation-frequency servo to a counter-clockwise tunable modulation generator based on the feedback from the second-lock-in-amplifier; and adjusting the modulation frequency of the counter-clockwise optical beam as the FSR changes to lock the modulation frequency of the counter-clockwise optical beam to the (p+0.5)FSR.

15. The method of claim 9, wherein the second servo is a FSR servo, the method further comprising:

providing feedback from the FSR servo to a piezo-electric device based on the feedback from the second-lock-in-amplifier;

adjusting a length of a gyroscope resonator coil by implementing the piezo-electric device based on the feedback received at the piezo-electric device; and locking the FSR to the modulation frequency of the clockwise optical through the adjustment to the length of the gyroscope resonator coil.

16. The method of claim 15, further comprising:

providing a temperature control signal to the gyroscope resonator from the FSR servo based on the feedback from the second-lock-in-amplifier.

17. The method of claim 9, wherein the second servo is a modulation-frequency servo, the resonator fiber optic gyroscope further comprises:

providing feedback from the modulation-frequency servo to a clockwise tunable modulation generator based on the feedback from the second-lock-in-amplifier;

adjusting the modulation frequency of the clockwise optical beam as the FSR changes to lock the modulation frequency of the clockwise optical beam to the (n+0.5) FSR;

providing feedback from the modulation-frequency servo to a counter-clockwise tunable modulation generator based on the feedback from the second-lock-in-amplifier; and adjusting the modulation frequency of the counter-clockwise optical beam as the FSR changes to lock the modulation frequency of the counter-clockwise optical beam to (p+0.5)FSR.

18. A resonator fiber optic gyroscope system, comprising:
a gyroscope resonator having a clockwise input port and a counter-clockwise input port and a free spectral range (FSR) corresponding to the resonator round trip length;
a first laser configured to couple a clockwise optical beam into to the clockwise input port;
a clockwise modulator to impose a modulation frequency equivalent to (n+0.5) times the FSR on the clockwise optical beam before the clockwise optical beam is coupled into the clockwise input port, where n is a positive integer;
a clockwise circulator;
a clockwise reflection detector to detect the clockwise optical beam output from a clockwise reflection port;
a first-lock-in-amplifier to receive a signal from the clockwise reflection detector, wherein the first-lock-in-amplifier demodulates at the first harmonic of the modulation frequency of the clockwise optical beam;
a clockwise-resonance-tracking servo to receive output from the first-lock-in-amplifier and to provide feedback to the first laser to lock the first laser to the gyroscope resonator;
a clockwise transmission detector to detect an optical beam output from the counter-clockwise input port;
a second servo;
a second-lock-in-amplifier to receive a signal from the clockwise transmission detector, wherein the second-lock-in-amplifier demodulates at the second harmonic of the modulation frequency of the clockwise optical beam and provides feedback to the second servo;
a third-lock-in-amplifier to receive a signal from the clockwise transmission detector, wherein the third-lock-in-amplifier demodulates at the first harmonic of the modulation frequency of the clockwise optical beam and provides feedback to the clockwise-resonance-tracking servo to correct errors in a clockwise resonance tracking loop,
a second laser configured to couple a counter-clockwise optical beam into to the counter-clockwise input port;
a counter-clockwise modulator to impose a modulation frequency equivalent to (p+0.5) times the FSR on the counter-clockwise optical beam before the counter-clockwise optical beam is coupled into the counter-clockwise input port, where p is zero or a positive integer and where p does not equal n;
a counter-clockwise circulator;
a counter-clockwise reflection detector to detect the counter-clockwise optical beam output from a counter-clockwise reflection port;
a fourth-lock-in-amplifier to receive a signal from the counter-clockwise reflection detector, wherein the fourth-lock-in-amplifier demodulates at the first harmonic of the modulation frequency of the counter-clockwise optical beam;
a counter-clockwise-resonance-tracking servo to receive output from the fourth-lock-in-amplifier and to provide feedback to the second laser to lock the second laser to the gyroscope resonator;
a counter-clockwise transmission detector to detect an optical beam output from the clockwise input port; and
the fifth-lock-in-amplifier to receive a signal from the counter-clockwise transmission detector, wherein the fifth-lock-in-amplifier demodulates at the first harmonic of the modulation frequency of the counter-clockwise optical beam and provides feedback to the counter-clockwise-resonance-tracking servo to correct errors in a counter-clockwise resonance tracking loop,
wherein one of: the modulation frequency of the clockwise optical beam is locked to the (n+0.5)FSR through the second servo; or the FSR is locked to 1/(n+0.5) times the modulation frequency of the clockwise optical beam through the second servo.

19. The resonator fiber optic gyroscope system of claim 18, wherein the second servo is a FSR servo, the resonator fiber optic gyroscope system further comprising:
a piezo-electric device to input feedback from the FSR servo, wherein a length of a gyroscope resonator coil is changed by the piezo-electric device to adjust the FSR of the gyroscope resonator based on the feedback from the FSR servo to lock the FSR in relation to the modulation frequency of the clockwise optical beam.

20. The resonator fiber optic gyroscope system of claim 18, wherein the second servo is a modulation-frequency servo, the resonator fiber optic gyroscope system further comprising:
a clockwise tunable modulation generator to drive the clockwise phase modulator; and
a counter-clockwise modulation to drive the counter-clockwise phase modulator,
wherein the clockwise tunable modulation generator receives feedback from the modulation-frequency servo to adjust the modulation frequency of the clockwise optical beam as the FSR changes, wherein the modulation frequency of the clockwise optical beam is locked to the (n+0.5)FSR, and
wherein the counter-clockwise tunable modulation generator receives feedback from the modulation-frequency servo to adjust the modulation frequency of the counter-clockwise optical beam as the FSR changes, wherein the modulation frequency of the counter-clockwise optical beam is locked to (p+0.5)FSR.

* * * * *